(12) United States Patent
Setlur et al.

(10) Patent No.: US 7,574,069 B2
(45) Date of Patent: Aug. 11, 2009

(54) RETARGETING IMAGES FOR SMALL DISPLAYS

(75) Inventors: Vidya Setlur, Irving, TX (US); Michael Gleicher, Madison, WI (US); Bruce Gooch, Evanston, IL (US); Saeko Takagi, Wakayama (JP); Ramesh Raskar, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 605 days.

(21) Appl. No.: 11/194,804

(22) Filed: Aug. 1, 2005

(65) Prior Publication Data

US 2007/0025637 A1    Feb. 1, 2007

(51) Int. Cl.
G06K 9/36 (2006.01)
(52) U.S. Cl. ............ 382/276; 382/173; 382/164; 382/171; 382/176; 358/466
(58) Field of Classification Search ........... 382/164, 382/168, 171, 173, 175, 176, 180, 190; 358/466
See application file for complete search history.

(56) References Cited

U.S. PATENT DOCUMENTS

| | | | | |
|---|---|---|---|---|
| 5,388,204 A * | 2/1995 | Ikeda et al. | ............ | 345/538 |
| 5,854,856 A * | 12/1998 | Moura et al. | ............ | 382/232 |
| 6,195,513 B1 * | 2/2001 | Nihei et al. | ............ | 396/332 |
| 6,219,823 B1 * | 4/2001 | Hama et al. | ............ | 716/12 |
| 6,556,715 B1 * | 4/2003 | Kozlowski | ............ | 382/232 |
| 6,670,963 B2 * | 12/2003 | Osberger | ............ | 345/629 |
| 6,711,298 B1 * | 3/2004 | Amonou | ............ | 382/240 |
| 6,973,220 B2 * | 12/2005 | Sakurai et al. | ............ | 382/266 |
| 7,317,826 B2 * | 1/2008 | Wilensky et al. | ............ | 382/162 |
| 7,397,948 B1 * | 7/2008 | Cohen et al. | ............ | 382/167 |
| 2003/0198382 A1 * | 10/2003 | Chen et al. | ............ | 382/173 |
| 2006/0284880 A1 * | 12/2006 | Zhou et al. | ............ | 345/582 |

OTHER PUBLICATIONS

Carpendale, M. S. T., and Montagnese, C. 2001. A framework for unifying presentation space. In Proceedings of UIST '01, 82-92.

Chen, L., Xie, X., Fan, X., Ma, W.-Y., Zhang, H.-J., and Zhou, H. 2002. A visual attention model for adapting images on small displays. Tech. Rep. MSRTR- 2002-125, Microsoft Research, Nov.

Harrison, P. 2001. A non-hierarchical procedure for re-synthesis of complex textures. In Proceedings of WSCG 2001, 190-197.

Itti, L., Koch, C., and Niebur, E. 1998. A model of saliency-based visual attention for rapid scene analysis. vol. 20, 1254-1259.

Kosslyn, S. M. 1978. On the ontological status of visual mental images. In Proceedings of the 1978 workshop on Theoretical issues in natural language processing, Association for Computational Linguistics, 167-171.

(Continued)

*Primary Examiner*—Vikkram Bali
*Assistant Examiner*—Ali Bayat
(74) *Attorney, Agent, or Firm*—Dirk Brinkman; Gene Vinokur (57) ABSTRACT

A method retargets an image to a different size. An input image is segmented into regions. Selected regions are cut from the input image to construct a background image. The background image is scaled to a predetermined size, and the selected regions are pasted back into the scaled background image to produce an output image.

14 Claims, 7 Drawing Sheets

OTHER PUBLICATIONS

Liu, H., Xie, X., Ma, W.-Y., and Zhang, H.-J. 2003. Automatic browsing of large pictures on mobile devices. In Proceedings of the eleventh ACM international conference on Multimedia, ACM, 148-155.

May, J. 2000. Perceptual principles and computer graphics. In Computer Graphics Forum, vol. 19.

Meer, P., and Georgescu, B. 2001. Edge detection with embedded confidence. IEEE Transactions on Pattern Analysis and Machine Intelligence 23, 12.

Suh, B., Ling, H., Bederson, B. B., and Jacobs, D. W. 2003. Automatic thumbnail cropping and its effectiveness. In Proceedings of the 16th annual ACM symposium on User interface software and technology, ACM, 11-99.

* cited by examiner

RETARGETING IMAGES FOR SMALL DISPLAYS

FIELD OF THE INVENTION

This invention relates generally to image processing, and more particularly to resizing images.

BACKGROUND OF THE INVENTION

Figure 1:
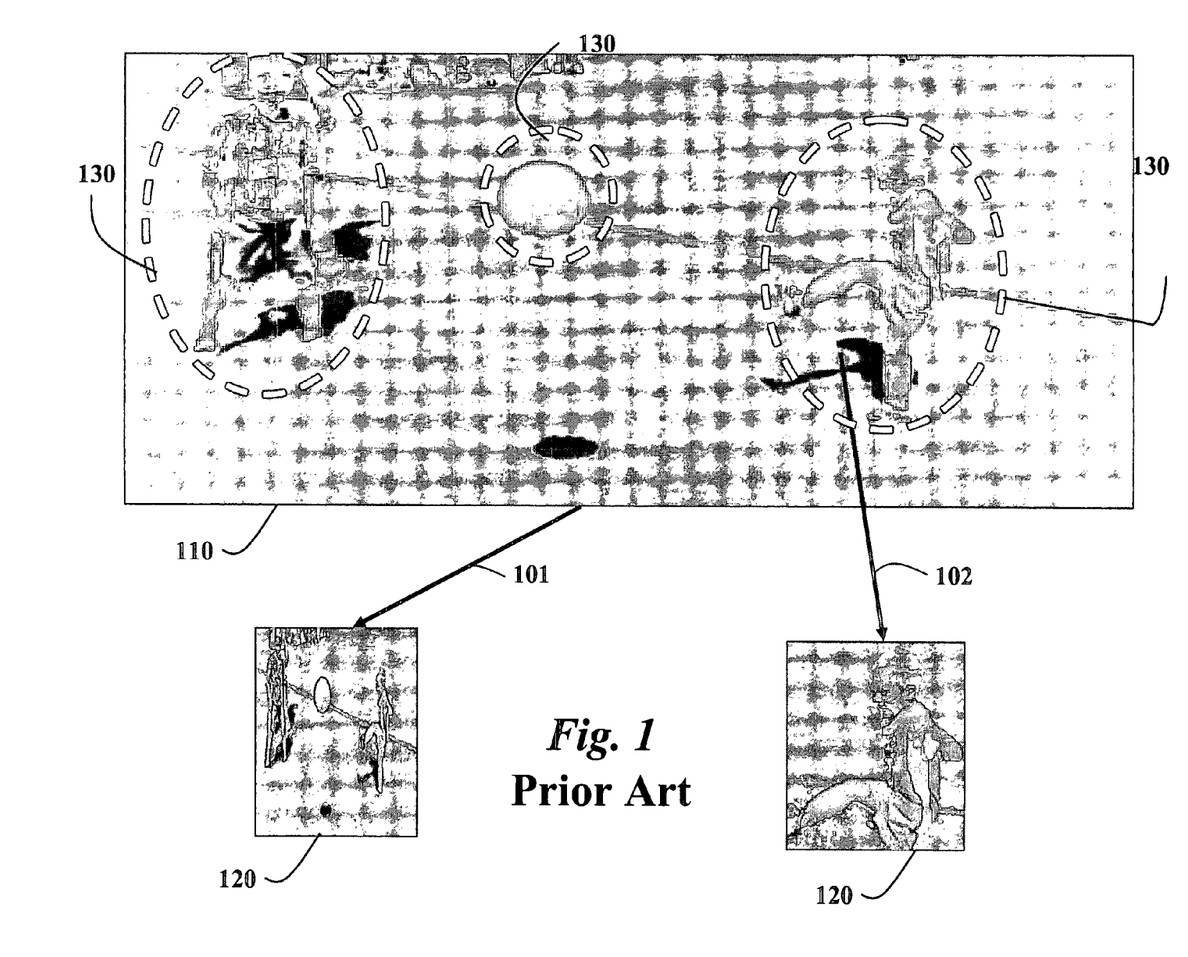
FIG. 1 includes prior art resized images.

As shown in FIG. 1, image retargeting adapts a large image 110 to a small image 120 so that significant objects in the large image are still recognizable in the small image. Image retargeting can be for used for devices with a small display screen, such as mobile telephones and PDAs. Image retargeting can also be used to generate 'thumbnails' of a large number of images to facilitate image browsing.

As shown in FIG. 1, known methods typically use linear scaling 101 or cropping 102. Scaling makes object too small to be recognized, while cropping eliminates objects entirely, see United States Patent Application 20050007382, Alexander K. Schowtka, filed Jan. 13, 2005, "Automated image resizing and cropping."

Most methods simply scale large images to a smaller size. If a specific portion of the large image is significant, or a change in the aspect ratio would cause distortion, cropping can be used with scaling.

Some methods do image retargeting automatically, see Suh et al., "Automatic thumbnail cropping and its effectiveness," Proceedings of the 16th annual ACM symposium on User interface software and technology, ACM, pp. 11-99, 2003; and Chen et al., "A visual attention model for adapting images on small displays," ACM Multimedia Systems Journal, pp. 353-364, 2003. Those methods use an importance model to identify significant portions in large images. Those methods can be extended to videos. However, cropping is of little use when there are multiple significant portions 130 spread over the image, see FIG. 1.

Another method uses a spline-based process for enlarging or reducing images with arbitrary scaling factors, Munoz, "Least-squares image resizing using finite differences," IEEE Transactions on Image Processing 10, 9, pp. 1365-1378, Sep. 2001. Their method applies a least-squares approximation of oblique and orthogonal projections for splines.

Another method renders small portions of a large image serially, Chen et al., "A visual attention model for adapting images on small displays,"Tech. Rep. MSRTR-2002-125, Microsoft Research, Nov. 2002. It is also possible to make a 'tour' of the large image by scanning it piecemeal, Liu et al., "Automatic browsing of large pictures on mobile devices," Proceedings of the eleventh ACM international conference on Multimedia, ACM, pp. 148-155, 2003.

Other methods deform the large image to exaggerate portions of image. For a survey, see Carpendale et al., "A framework for unifying presentation space," Proceedings of UIST '01, pp. 82-92, 2001.

SUMMARY OF THE INVENTION

The invention retargets an image to a different size. An input image is segmented into regions, and selected regions are cut from the input image to construct a background image. The background image is scaled to a predetermined size, and the selected regions are pasted back into the scaled background image to produce an output image.

DETAILED DESCRIPTION OF THE PREFERRED EMBODIMENT

System and Method

Figure 2:
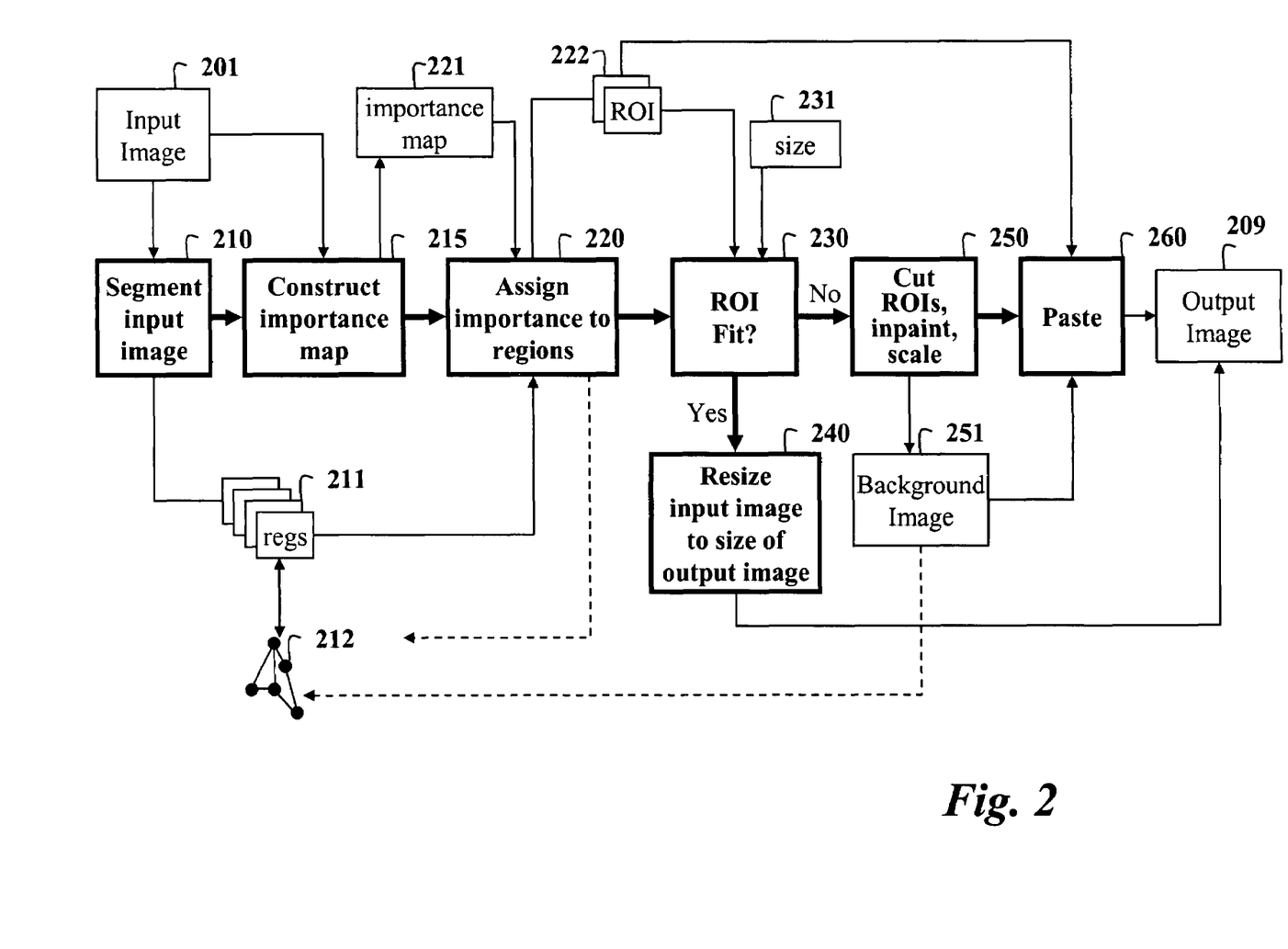
FIG. 2 is a flow diagram of a method according to a preferred embodiment of the invention.

FIG. 2 shows a method for retargeting an input image 201 to an output image 209 having a different size. The input image 201 is segmented 210 into regions (regs) 211, see also FIG. 4. A dual graph 212 is maintained for the segmented regions. In the dual graph, nodes indicate regions, and edges connecting nodes indicate adjacency.

An importance map 221 is constructed 215 from the input image. The importance map is used to assign 220 an importance to each region. This generates regions of importance (ROIs) 222. The ROIs 222 are now rank ordered according to their importance. The importance map can be constructed semi-automatically or automatically, as described below.

If all of the ROIs 222 fit 230 into an output image 209 of a predetermined size 231, the input image is resized 240 to the size of the output image. The output image can be smaller or larger than the input image. Otherwise, we 'cut' 250 the ROIs 222 from the input image.

Optionally, we can fill the resulting 'holes' using inpainting to produce a background image 251 of the appropriate size 231. It should be understood that the background image 251 is not required.

Finally, the ROIs 222 are scaled and 'pasted' 260 into the background image 251 according to their importance rank to produce the reduced size output image 209. The background image can be a null or empty image.

Figure 3:
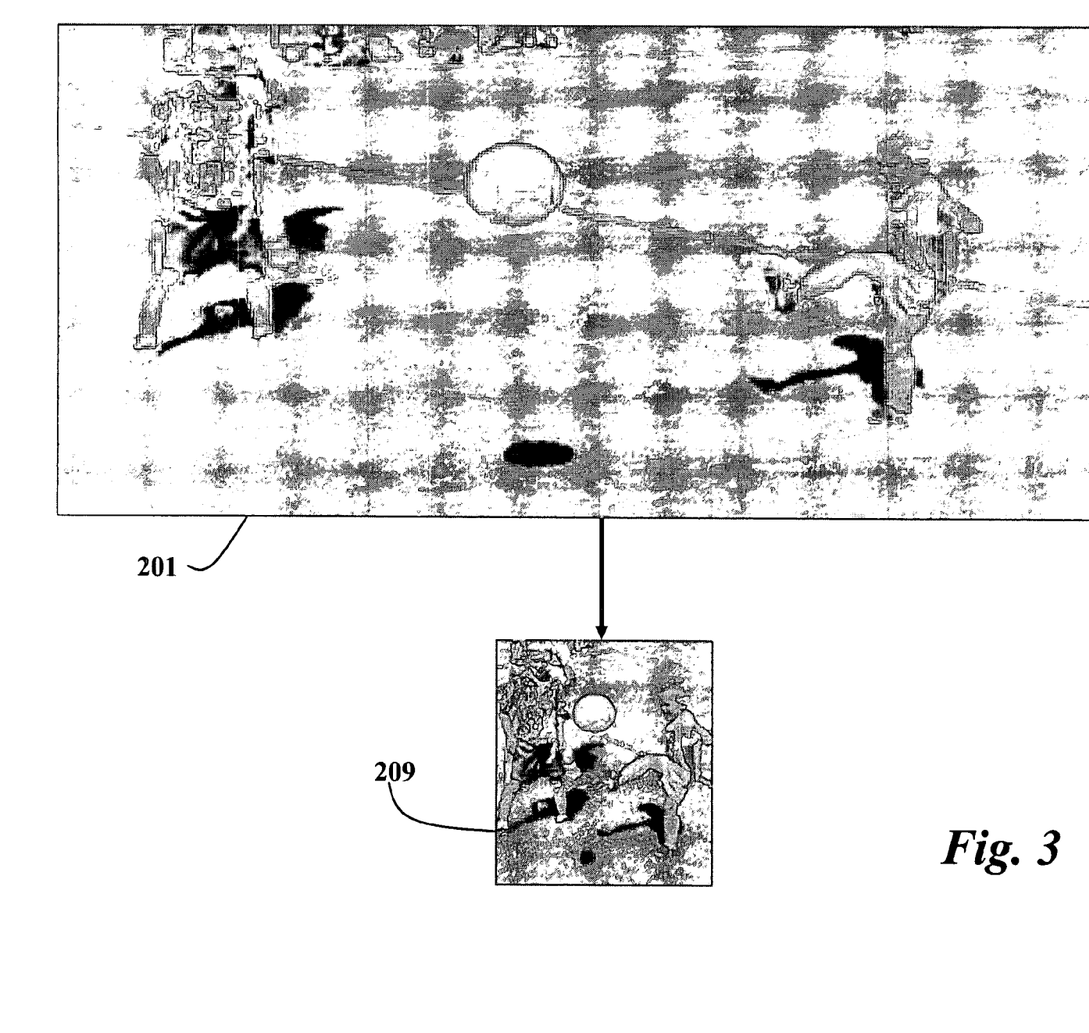
FIG. 3 includes resized images according to an embodiment of the invention.

FIG. 3 shows the input image 201 and the output image 209 produced by the method of FIG. 2. Note that the important objects can retain their original sizes and locations, i.e., their spatial relationship in the output image. However, it should be understood that the important objects can be moved to different relative locations. For example, the aspect ratio in the input and output image can be different, e.g., 'portrait' and 'landscape', or HDTV 'letter-box' and standard TV 3:4 ratio.

Image Segmentation

In the segmenting, we use a mean-shift operation based on Meer et al., "Edge detection with embedded confidence," IEEE Transactions on Pattern Analysis and Machine Intelligence 23, pp. 1351-1365, 2001, incorporated herein by reference. The segmentation step 210 takes as input the following parameters: a spatial radius $h_s$, a color radius $h_r$, and a minimum number of pixels M that constitute a region.

Because selecting these parameters is difficult, we first over-segment the input image using relatively low values for $h_r$ and M, and later merge adjacent regions based on color and intensity distributions in the CIE-Luv color space. The CIE-Luv color space is perceptually uniform, and designed specifically for emissive colors, which correspond to images captured by a camera or rendered by a computer graphics program.

The segmented regions 211 are stored as a dual graph 212. In the graph, nodes correspond to regions, and edges indicate adjacency of regions. Each node is associated with a 3D color histogram for each CIE-Luv component. Region merging combines adjacent nodes using a color similarity metric, see Swain et al., "Color indexing," International Journal on Computer Vision 7, 1, pp. 11-32, 1991, incorporated herein by reference.

Figure 4:
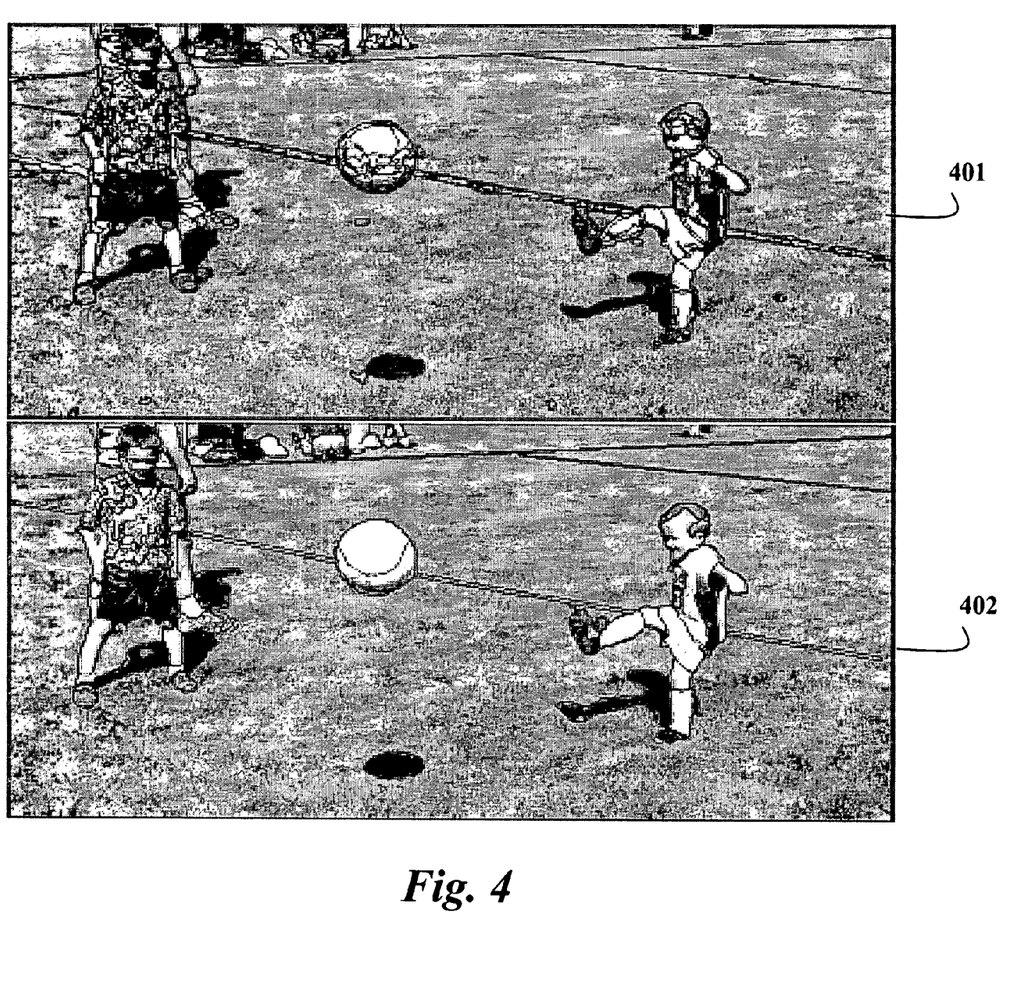
FIG. 4 includes images of segments before and after merging.

FIG. 4 show a segmented image 401 and a merged image 402 of regions.

Importance Map

To identify the ROIs 222, we use the importance map 221. A semi-automatic version of the map can allow a user to specify important regions. The importance map assigns 220 a scalar value to each pixel. The scalar value is an indication of the relative importance of the pixel according to, for example, an attention model. We use measures of visual salience, e.g., image regions likely to be interesting to the low-level vision system, and high-level detectors for specific objects that are likely to be important, such as human faces, bodies, buildings, signs, and large objects. Regions with textures such as grass, waves, and leaves are deemed less important.

We can construct the importance map 221 as a scaled sum of a visual saliency process, Itti et al., "A model of saliency-based visual attention for rapid scene analysis," IEEE Transactions on Pattern Analysis and Machine Intelligence, vol. 20, pp 1254-1259, 1998; and a face detection process, Niblack et al., "The qbic project: Querying images by content, using color, texture, and shape," Proceeding of the SPIE, Vol. 1908, SPIE, pp. 173-187, 1993. The saliency and face detection processes take color images as input, and return gray-scale images whose pixel values represent the importance of the corresponding pixel in the input image 201. The importance map construction can accommodate other attention models as desired.

We normalize pixel values obtained from the attention model, sum the values, and re-normalize the values to construct the importance map. We determine an importance value for each node of the dual graph by summing pixel values in the importance map corresponding to the regions 211.

We extend the method of Swain et al. to include additional dimensions of importance and determine regions of importance ROI by combining nodes in the dual graph 212. The ROIs are formed using a clustering process that first considers unattached nodes with a highest importance. Regions with small importance that are adjacent to regions with higher importance, but which cannot be combined because of color differences, are treated as unimportant. The clustering algorithm is applied recursively until all nodes, i.e., regions, in the dual graph have been processed.

Figure 5:
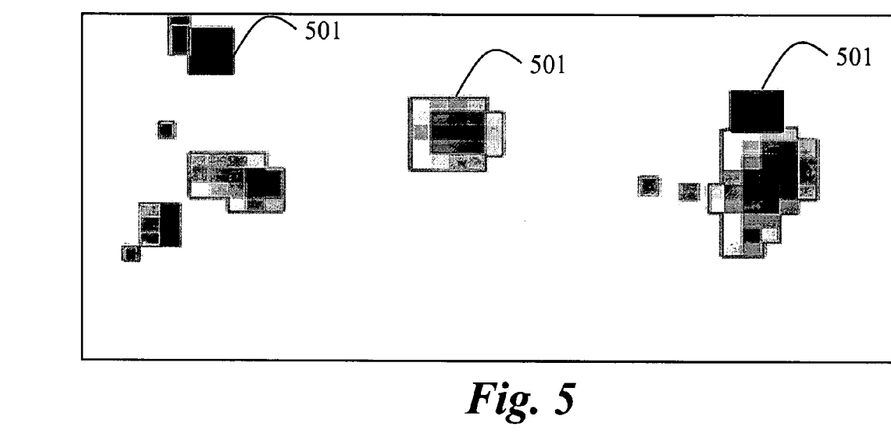
FIG. 5 includes images with salient regions and important regions.
Figure 6:
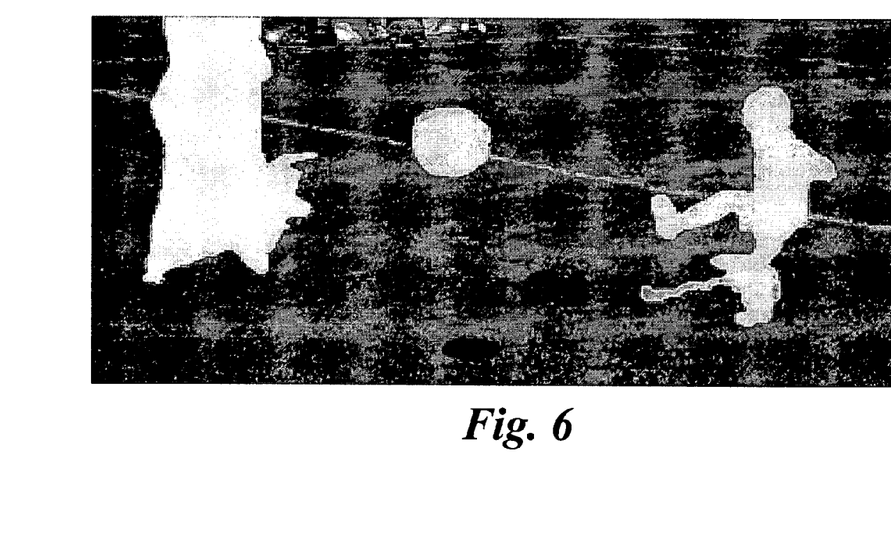
FIG. 6 is an importance map after merging.

FIG. 5 shows saliency regions 501 for the input image according to pixel intensity, and FIG. 6 the corresponding importance map after merging. In the importance map, 'white' pixels have a high importance.

Background Image

The optional background image 251 is constructed by cutting the ROIs from the input image, and storing the centroids of the regions that were cut in the dual graph 212. Otherwise, the background image can be a 'null' or 'empty' image. Storing the centroids of the ROIs aids in minimizing visual artifacts in a later pasting step 260. The cutting of the ROIs is according to the importance values associated with the regions according to the importance map. The number of ROIs that are cut can depend on a predetermined threshold, and the importance values. For example, if there are ten ROIs, with respective importance values

[1.0, 1.0, 9.0, 0.4, 0.2, 0.2, 0.1, 0.1, 0.1, 0.0] then the top three regions are cut.

Inpainting

Inpainting fills the resulting 'holes' in the optional background image 251 with plausible textures. Inpainting is a texture synthesis technique typically used to fill in scratches and voids in images. Inpainting allows us to perform image manipulations on the background without introducing visual artifacts.

The image inpainting method involves two stages. First, pixel relationships are analyzed. This process evaluates the extent to which each pixel constrains values taken by neighborhood pixels. To compare individual pixels, the sum of the absolute values of the differences in each color component is used. In order to measure the degree of similarity between patches of the input image and the output image, a weighted Manhattan distance function is used.

The second stage involves adding pixels to the holes in the background image until the holes are filled. The order in which pixels are added determines the quality of the inpainting. Priorities are assigned to each location in the background image, with highest priority given to locations highly constrained by neighboring pixels.

Then, while there are still empty locations, empty location with a highest priority are located. Pixels from the input image are selected to place in that location, and neighboring pixels are updated based on the new pixel value.

Figure 7A:
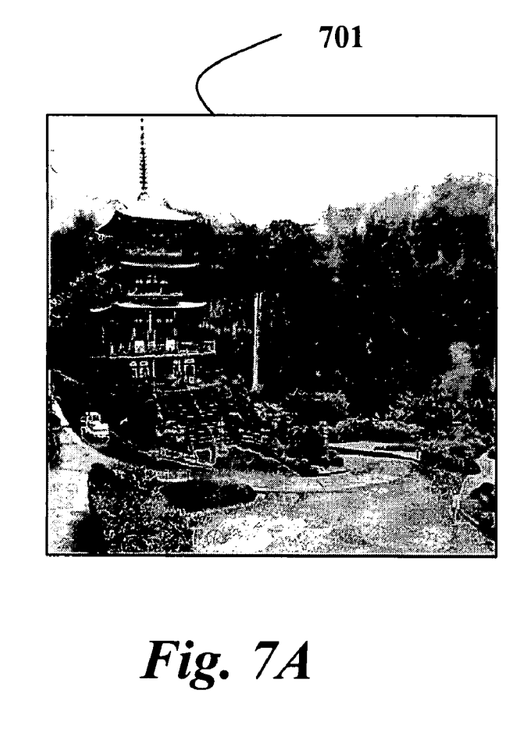
FIGS. 7A-7C include images after cutting and inpainting according to an embodiment of the invention.
Figure 7B:
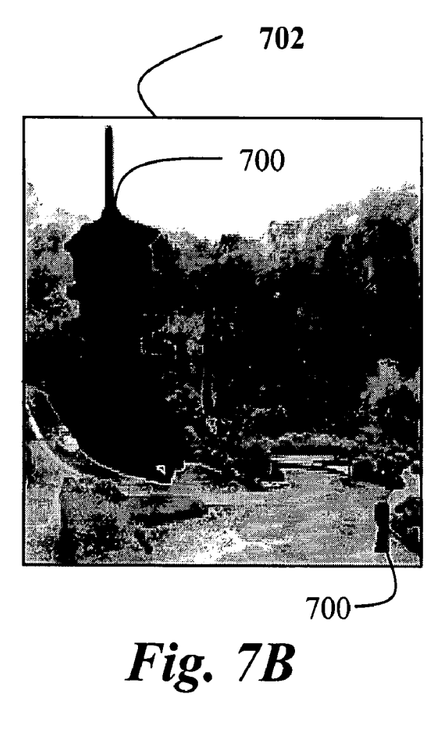
Figure 7C:
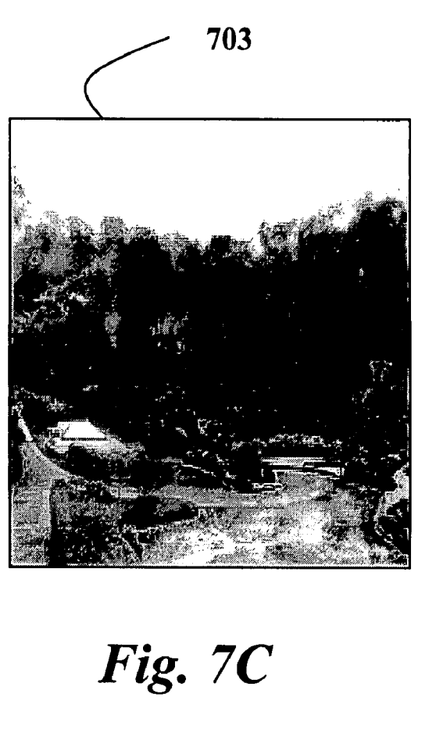
Figure 8A:
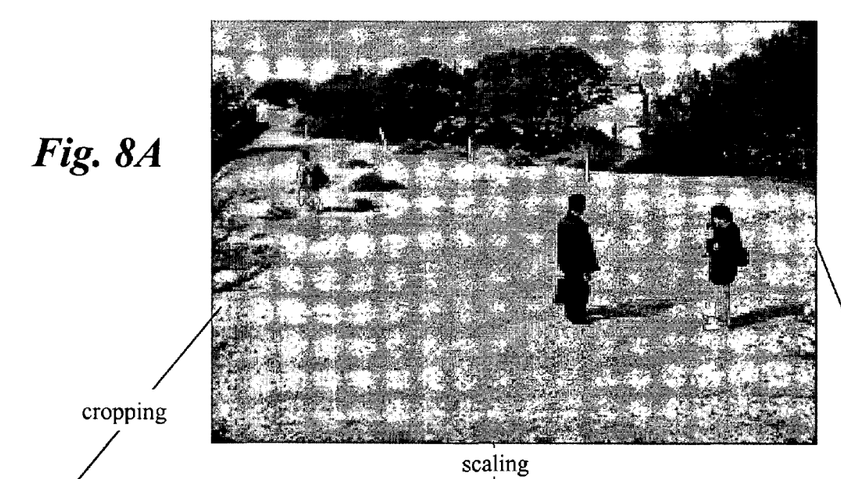
FIG. 8A is an input image.
Figure 8B:
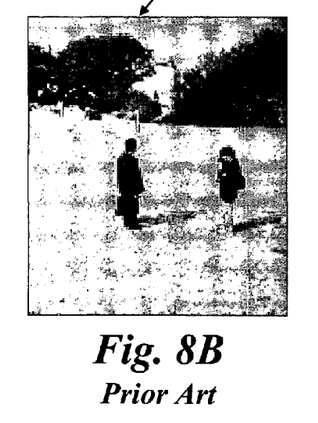
FIG. 8B is a prior art cropped image.
Figure 8C:
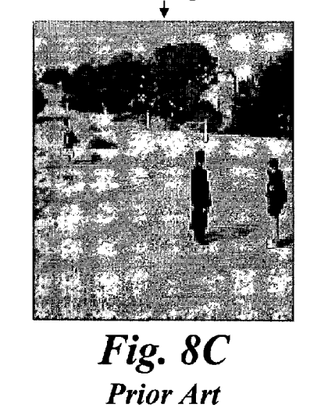
FIG. 8C is a prior art cropped and scaled image.
Figure 8D:
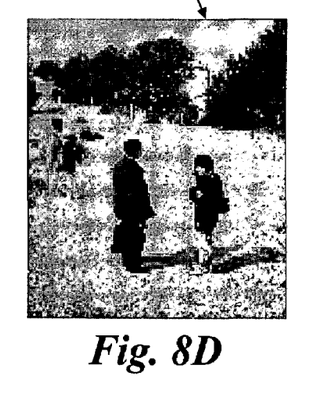
FIG. 8D is an image resized according to an embodiment of the invention.

FIGS. 7A-7C show, respectively, an input image 701, an image 702 with holes 700 of ROIs cut out, and an image 703 after infilling.

After infilling, the background image 251 is scaled to a size to match the output image 209 using linear resizing. The size of the output image can be smaller or larger than the input image. The inpainting ensures that there no gaps in the output image due to misalignment during the pasting 260 of the reinserted ROIs.

Pasting

Our pasting 260 can preserve the relative spatial relationship of the ROIs in the output image. This is important for recognizability. Recognizability is described generally by May in "Perceptual principles and computer graphics," Computer Graphics Forum, vol. 19, 2000, incorporated herein by reference. Our method performs a 'greedy' pasting. That is the most important ROI is pasted into the inpainted background image first, and the least important ROI is pasted last.

To determine the position and scale of each ROI, we paste the ROIs near the position in the output image that the ROIs would have appeared were the ROIs not cut out. The scale of the ROIs in the output image is as close as possible to the scale of the corresponding ROIs in the input image. Each ROI is first pasted, at full scale, such that the centroid of the ROI is on the centroid saved in step 250 that constructs the background. This assures that all ROIs maintain their relative positions in the output image 209.

Two resizing steps adjust the ROI uniformly to fit in the output image. All scaling is done uniformly to preserve the aspect ratios of the ROI. This improves recognizability. The first resizes the ROIs to avoid overlap with any already pasted ROIs, because occlusions can give a false depth cue. As the ROI is pasted, a check is made to ensure that the ROI is pasted in a region of the background image with a similar color as in the input image. This is done using the dual graph 212 that identifies the regions adjacent to the ROI in the input image. If these regions are not merged, then the ROI is uniformly scaled until this condition is met. This makes the ROI consistent with the background. Matching the background with the ROI also reduces visual artifacts.

It should be understood that the relative location of the important ROIs can change. The key for recognizability is that the ROIs are retained in the output image.

FIGS. 8A, 8B, 8C, and 8D, respectively, show an input image, prior art cropped and scaled images, and an output image retargeted according to the invention. The improved recognizability in the image 8D is self-evident.

Effect of the Invention

The image retargeting method as described above preserves recognizability of important objects when a large image is reduced to a smaller size. Prior art methods generally maintain photorealism but reduce recognizability because information is lost, either due to scaling or cropping. In contrast, the present method elects to reduce photorealism to maintain recognizability of important objects in the images. Viewers prefer to recognize key objects in images, and are willing to accept the distortions.

It is to be understood that various other adaptations and modifications may be made within the spirit and scope of the invention. Therefore, it is the object of the appended claims to cover all such variations and modifications as come within the true spirit and scope of the invention.

We claim:

1. A method for retargeting an image, comprising a computer system for performing steps of the method, comprising the steps of:

segmenting an input image into a plurality of regions, wherein parameters of the segmenting include a spatial radius $h_s$, a color radius $h_r$, and a minimum number of pixels M for each of the plurality of regions;

cutting selected regions from the input image to construct a background image;

scaling the background image to a predetermined size; and pasting the selected regions into the scaled background image to produce an output image, and further comprising:

constructing an importance map from the input image;

assigning an importance to each of the plurality of regions;

selecting the selected regions as important regions according to the importance map, in which a relative spatial relationship between the important regions is maintained in the output image.

2. The method of claim 1, further comprising:

maintaining a dual graph for the plurality of regions, the dual graph including nodes connected by edges, the nodes corresponding to the plurality of regions and the edges corresponding to an adjacency of the plurality of regions.

3. The method of claim 2, in which each node is associated with a 3D color histogram for each CIE-Luv component of corresponding pixel in each of the plurality of regions.

4. The method of claim 1, in which the importance map is constructed semi-automatically.

5. The method of claim 1, in which the importance map is constructed automatically.

6. The method of claim 1, in which the cutting produces holes in the background image, and further comprising:

inpainting the holes with plausible textures.

7. The method of claim 1, in which the input image is smaller than the output image.

8. The method of claim 1, in which the segmenting uses a mean-shift operation.

9. The method of claim 1, in which the importance map is constructed according to an attention model.

10. The method of claim 1, in which an order of the pasting is according to the importance of cut regions.

11. The method of claim 1, in which the input image is larger than the output image.

12. The method of claim 1, in which the background image is an empty image.

13. The method of claim 1, in which the input image is first over-segmented by using relatively low values for $h_r$ and M, and then merging adjacent regions based on color and intensity distributions of pixels in the plurality of regions.

14. The method of claim 13, in which the intensity distributions is in a CIE-Luv color space.

* * * * *